United States Patent [19]

MacKenzie

[11] 4,286,361

[45] Sep. 1, 1981

[54] HOSE CLAMP

[76] Inventor: Donald R. MacKenzie, 6443 Menlo St., Simi Valley, Calif. 93063

[21] Appl. No.: 176,825

[22] Filed: Aug. 11, 1980

[51] Int. Cl.³ ............................................. B65D 63/02
[52] U.S. Cl. .................................... 24/276; 24/279; 24/281; 24/20 R; 24/20 LS
[58] Field of Search ................ 24/276, 279, 281, 282, 24/283, 20 R, 20 S, 20 LS, 20 TT, 20 W, 21

[56] References Cited

U.S. PATENT DOCUMENTS

| 1,986,748 | 1/1935 | Pritchard | 24/279 |
| 2,452,245 | 10/1948 | Kollman | 24/281 |
| 2,750,645 | 6/1956 | Seltzer | 24/279 |
| 2,944,314 | 7/1960 | Black | 24/279 |
| 2,990,599 | 7/1961 | Gustavsson | 24/279 |
| 3,396,439 | 8/1968 | Schaub | 24/281 |
| 3,579,754 | 5/1971 | Oetiker | 24/279 |
| 3,736,627 | 6/1973 | Sosinski | 24/20 W |
| 3,879,811 | 4/1975 | Leverton | 24/281 |
| 4,155,574 | 5/1979 | Hulsey | 24/279 |

FOREIGN PATENT DOCUMENTS 1264779  5/1961  France ................... 24/274 R

*Primary Examiner*—Victor N. Sakran
*Attorney, Agent, or Firm*—Jack C. Munro

[57] ABSTRACT

A hose clamp wherein one end of the clamping band is movable to any desired longitudinal position of the band so as to initially take up the slack of the band during installation of the hose clamp. This same end is held without being permanently attached to the clamping mechanism.

3 Claims, 3 Drawing Figures

HOSE CLAMP

BACKGROUND OF THE INVENTION

The field of this invention relates to clamping mechanisms and more particularly to a hose clamp which uses a flexible band which operates in conjunction with a worm gear to move one end with respect to the other end of the band, which ends are located in an overlapping relationship.

The use of such hose clamps are well known. It is common to select a hose clamp of a particular desired size and that particular hose clamp will operate for a certain range of diameters of hoses. For example, a given size of hose clamp will operate between a half an inch to two inches in diameter of hose. Another hose clamp will operate between two inches and four inches of hose diameter. As a result, normal installation of a hose clamp invariably results in a substantially larger than necessary clamp being employed. In other words, if the hose diameter is two and a quarter inches, it is necessary to employ a hose clamp which is capable of accommodating a four inch diameter hose. This means that during the installation there is automatically a one and three quarter inch radius slack that needs to be taken up. In terms of the actual length of the band, the distance is substantially greater and in this particular instance, something over five inches. This means that the user in installing the hose clamp must turn the worm screw until this entire slack is taken up before the hose clamp begins to tighten on the hose. This procedure is time consuming because the worm screw cannot be turned rapidly.

It would be desirable to employ a hose clamp in which during installation, the slack within the band can immediately be taken up thereby not requiring operation of the worm screw in order to take up that slack. Also, it would be further desirable to have a single hose clamp be employed for all sizes, thereby eliminating the need for different sizes of hose clamps.

SUMMARY OF THE INVENTION

The hose clamp of this invention employes a conventional flexible band which has a plurality of spaced apart openings therein. The flexible band is to be cut in the desired length according to the installation. The clamping mechanism includes a housing within which is rotatably supported a worm screw. The housing includes a plate, the exterior surface of which has a plurality of inclined protuberances. This plate also includes a guide bracket. One end of the band is to extend through the guide bracket and openings within the band are to engage with the protuberances. The other end of the band is to be conducted adjacent the inner surface of the plate and the openings within this band are to engage with the worm screw. Any slack of the band can be quickly taken up by physically moving the band through the guide bracket and having the protuberances engage with band openings at this particular location of the band. Tightening of the band upon the hose is accomplished in the conventional manner by rotating of the worm screw.

The primary objective of this invention is to construct a hose clamp which can be quickly and easily installed and which eliminates slack of the clamping band during the installation procedure of the hose clamp.

A further objective of this invention is to construct a hose clamp which is adaptable through a wide range of sizes thereby eliminating the need for different sizes of hose clamps.

DETAILED DESCRIPTION OF THE SHOWN EMBODIMENT

Figure 1:
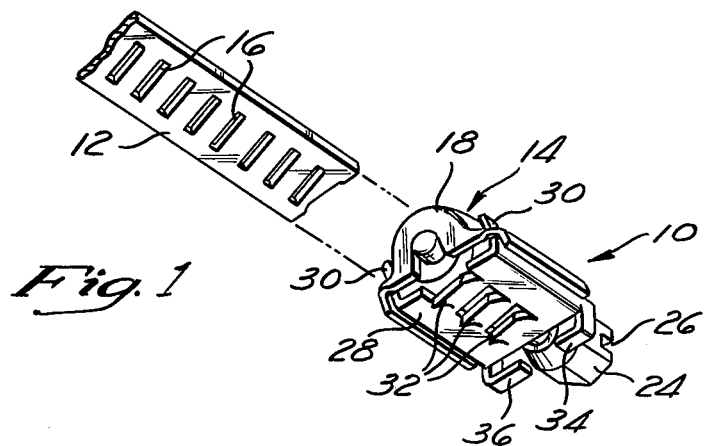
FIG. 1 is a bottom perspective view of the clamping mechanism employed in conjunction with the hose clamp of this invention.
Figure 2:
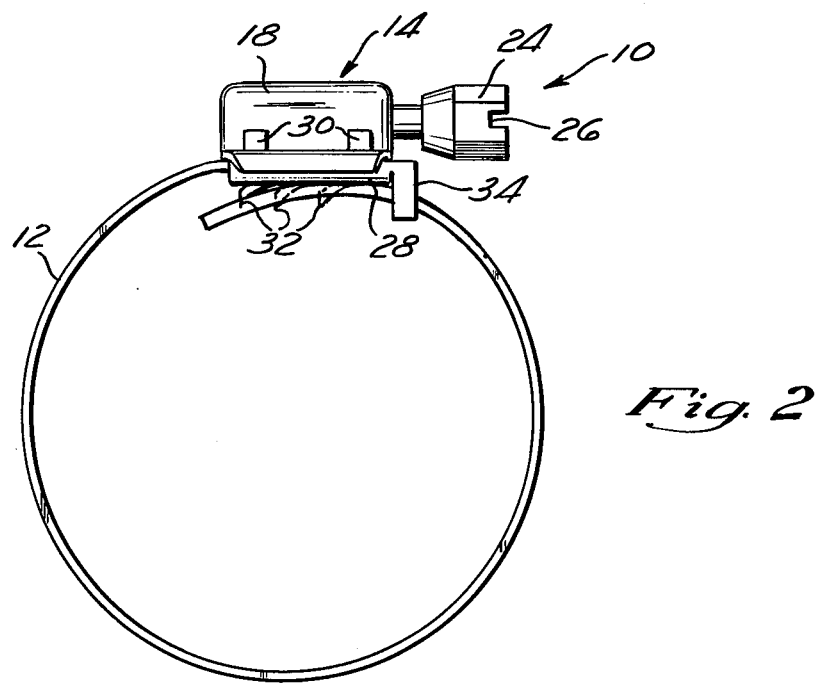
FIG. 2 is a side elevational view of the hose clamp of this invention.

Referring particularly to the drawing, there is shown the hose clamp 10 of this invention which is composed primarily of a clamping band 12 and a clamping mechanism 14. The clamping band 12 is deemed to be conventional and basically takes the form of a flexible, sheet metal band which is bendable into the circular shape shown in FIG. 2. The band 12 includes, along its entire longitudinal length, a plurality of openings 16. The openings 16 are evenly spaced apart.

Figure 3:
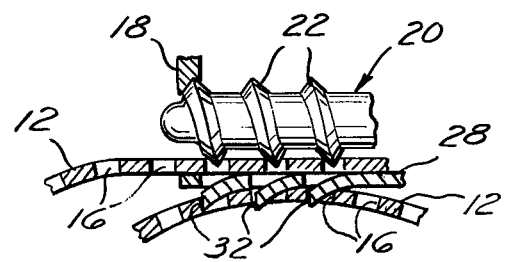
FIG. 3 is a longitudinal, segmental, cross-sectional view taken through the clamping mechanism of the hose clamp of this invention.

The clamping mechanism 14 includes a housing 18 within which is rotatably mounted a worm screw 20. The worm screw 20 has a spiral ridge 22 which is engageable at three separate locations of the openings 16 of the band 12, as shown in FIG. 3. The worm screw also includes a polygonal shaped enlarged head 24. The enlarged head 24 includes a slot 26 which is to be engageable with a tool such as a screw driver.

The housing 18 also includes a plate 28. The lateral sides of the plate 28 include tabs 30. The tabs 30 are conducted through appropriate openings formed within the other portion of the housing 18 and are appropriately bent so as to securely connect the plate 28 to the remainder of the housing 18.

The exterior surface of the plate 28 has outwardly extending therefrom a plurality of protuberances 32. It is to be noted that three in number of the protuberances 32 are shown, but it is considered to be within the scope of this invention that any convenient number could be employed. It will only be required to have only one protuberance 32 engaged with an opening 16 in order to operate satisfactorily. The purpose of using the three protuberances is so to accommodate different diameters of the band 12. In other words, in a small diameter of band 12, only the protuberance 32 closest to the arms 34 and 36 will engage with band 12. In a larger diameter of band 12, all three protuberances will be engaged with openings 16.

Also, integrally formed with the plate 28 is a guide bracket assembly in the form of facing L-shaped arms 34 and 36. The arms 34 and 36 combine to form a slot through which is to be conducted one end of the band 12. It is to be noted that the protuberances 32 are slanted outwardly with respect to the arms 34 and 36.

The operation of the hose clamp 10 of this invention is as follows: The user selects a desired length of band 12 to be employed for the particular installation. Normally, this length of band 12 will be cut from a longer length of band. The operator then takes one end of the band 12 and inserts it adjacent the inner surface of the plate 28. The operator then proceeds to turn worm screw 20 which causes the ridge 22 to engage with a series of the openings 16 formed within this end of the band 12. The operator then proceeds to place the band 12 about the hose which is to be clamped. The operator then takes the other end of the band 12 and inserts it through the slot formed by the arms 34 and 36 and slides the band over the slanted protuberances 32 until the entire amount of slack of the band has been taken up. The operator then, by automatically releasing of the band 12, causes the openings 16 formed within this particular end of the band to connect with the protuberances 32. The user then proceeds to rotate the worm screw 20 by application of a tool to the polygonal shaped enlarged head 24 or by use of a tool connecting with a slot 26. The hose clamp is then tightened to the desired position.

What is claimed is:

1. A hose clamp comprising:
   a flexible band, said band having a series of evenly spaced apart openings;
   a clamping mechanism having a housing, said housing having an inner exterior surface within which is formed a protruding member assembly, said inner exterior surface terminating longitudinally in a fore end and an aft end, said protruding member assembly being spaced from said fore end, said protruding member assembly to connect with at least one of said openings at one end of said band thereby fixing the position of said band relative to said housing, a worm screw rotatably mounted upon said housing, said worm screw to engage at least one of said openings at the other end of said band, said other end of said band being located between said worm screw and said protruding member assembly, whereby turning of said worm screw causes relative movement between said one end and said other end and varying of the size of the enclosed area of said band; and
   a guide bracket assembly, said guide bracket assembly being attached to said housing at said fore end, said band to extend through said guide bracket assembly to guidingly locate and position said protruding member assembly within said openings of said band.

2. A hose clamp as defined in claim 1 wherein:
   said protruding member assembly comprising a plurality of separate protruding members, said protruding members being spaced apart.

3. A hose clamp as defined in claim 2 wherein:
   said protruding members being inclined toward said aft end so said one end of said band will slide over said protruding members to facilitate insertion of said band to engage with said protruding members at the desired longitudinal location along said band, said protruding members then preventing withdrawl of said band out of engagement with said housing.

* * * * *